Dec. 8, 1953  J. H. DULLIGAN  2,661,540
HOLE GAUGE
Filed Nov. 13, 1950
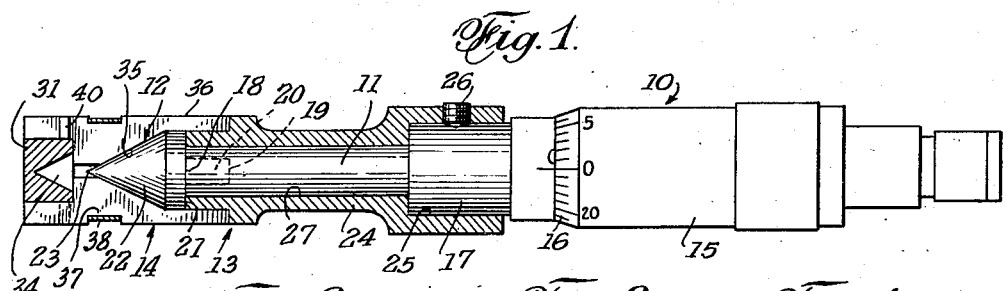
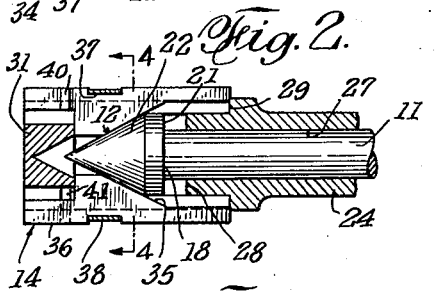 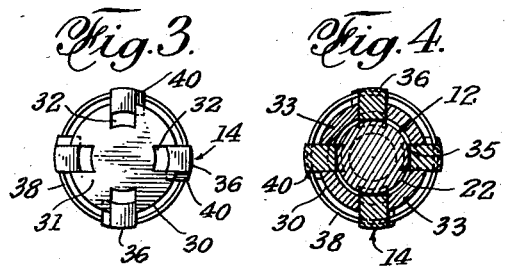
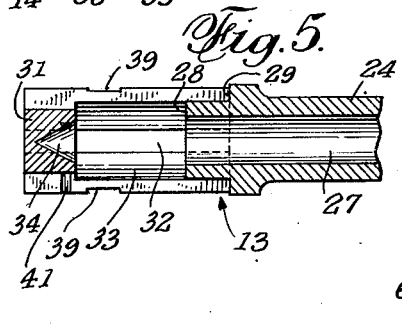 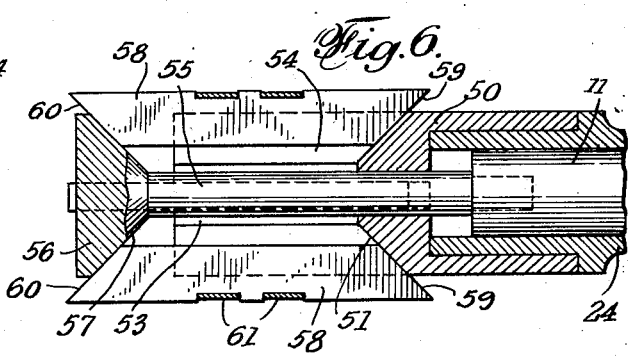
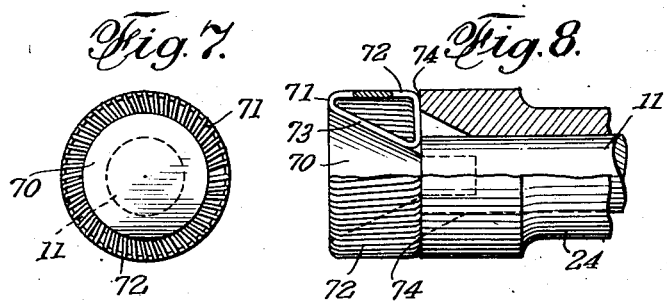
Inventor
JOHN H. DULLIGAN
By C. G. Stratton
Attorney

Patented Dec. 8, 1953

2,661,540

UNITED STATES PATENT OFFICE 2,661,540

HOLE GAUGE

John H. Dulligan, South Gate, Calif.

Application November 13, 1950, Serial No. 195,219

2 Claims. (Cl. 33—178)

This invention relates to measuring devices and deals more particularly with a device for measuring internal diameters.

Reference is made to applications Serial Nos. 239,151 and 239,152, both filed July 28, 1951, the same being continuations in part of this application.

The inspection of small holes such as drilled and small reamed holes, at the present time, entails the use of a multiplicity of expensive gauges of the "go—no go" type, even when the range of hole sizes is relatively small. While attempts have been made to provide diameter-measuring tools for the relatively large bores of cylinders, tubes, etc., there are not now available satisfactory inexpensive gauges to measure internal diameters of holes of the order of the letter drill sizes. These latter sizes range between .234" and .413" and, while not intended as limiting, indicate the general range contemplated for the present gauge.

Accordingly, it is an object of the present invention to provide a hole gauge more particularly adapted to measure relatively small holes, as above indicated, in a manner to expedite inspection and to reduce expense.

Whereas prior devices depended on oppositely directed pins to gauge in internal diameter, the same, unless considerable time was used to effect at least two gauging operations for each hole, would give inaccurate readings if the hole were not truly round. Also, if such prior tools were not squarely entered into a hole, the angle of presentation to the hole would affect the reading. A further object of the invention, therefore, is to provide a hole gauge that automatically centers and squares itself in the hole being gauged and, at all times, will give the same reading regardless of the "out-of-round" condition of the hole.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts which will more fully appear in the course of the following description. However, the drawings merely show and the following description merely describes embodiments of the present invention, which are given by way of illustration or example only.

In the drawings, like reference characters designate similar parts in the several views.

Fig. 1 is a longitudinal sectional view of a preferred form of hole gauge and embodying a conventional micrometer head, the latter being shown in elevation.

Fig. 2 is a broken sectional view of the gauging end of the gauge in another position.

Fig. 3 is an end view of the gauge as in Fig. 2.

Fig. 4 is a cross-sectional view as taken on line 4—4 of Fig. 2.

Fig. 5 is a broken longitudinal sectional view of the gauge body.

Fig. 6 is an enlarged sectional view of a modificaton.

Fig. 7 is an end view of another modification.

Fig. 8 is an elevational view, in quarter section, of the gauge shown in Fig. 7.

With particular reference to Figs. 1 to 5, the gauge shown comprises, generally, a micrometer head 10 having a stem 11, a conical tip 12 for the end of said stem, a body 13 connected to the micrometer head and gauge pieces 14 carried by by the body.

The micrometer head is generally conventional and comprises a barrel 15 from the graduated end 16 of which fixedly extends stem 11. While not shown, the stem, in that portion which is within barrel 15, is threaded and has threaded connection with sleeve 17, which is concentric with the stem. It will be clear that relative rotation of the barrel and sleeve will result in relative axial movement of said barrel and sleeve. For the purposes of this disclosure, it is assumed that sleeve 17 is fixed and that barrel 15 and stem 11 revolve and move axially with respect thereto.

In the present case, stem 11 is provided with a squared end 18 in which is provided an axial socket 19. Conical tip 12 has a shank 20 that tightly, yet removably, fits said socket, the tip having a squared end 21 that fits flat against end 18 of the stem. The conical face 22 of the tip is outwardly directed and, in this case, the angle of said tip is such that, in axial cross-section, the face is the hypotenuse of a right triangle in which one leg is the radius at the base of face 22 and the other leg is a perpendicular height from said base to the apex 23 that is twice the radius. Consequently, the diameter of the tip base equals said perpendicular height.

The body 13 comprises a tubular member 24 provided at one end with a socket 25 into which sleeve 17 is accurately fitted. A set screw 26 is used to removably mount tubular member 24 so that the same constitutes a fixed extension of sleeve 17. A longitudinal bore 27 freely accommodates stem 11. The opposite end of tubular member 24 terminates in a face 28 that serves as an abutment for end 21 of tip 12. Said opposite end of member 24 is defined by an annular flange 29 axially spaced from face 28.

The body 13 further comprises a housing 30 that is formed as a tubular member having an end wall 31. A set of uniformly arranged longitudinal slots 32 divides housing 30 into equal arcuate fingers or segments 33 that extend throughout the length of the housing, said segments integrally extending from end wall 31 as best seen in Fig. 5. Said segments snugly fit over the mentioned opposite end of tubular member 24, abutting flange 29. The outer diameter of housing 30 represents the smallest diametral size that the present gauge can measure.

While four slots 32 are shown, the number may vary as desired and may be increased as the diametral size of the body is increased. An even number of such slots is desired for a like number of gauge pieces 14 so that the gauge will have one or more pairs of directly opposed gauge pieces. In order to keep the length of housing 30 as short as is practicable, the inner side of end wall 31 is provided with a conical seat 34 into which the apex 23 of the tip may enter, as shown in Fig. 2.

The gauge pieces 14 are all exactly alike and comprise flat elongated elements that slidably fit in slots 32. In this case, the gauge pieces are coextensive in length with said slots. Each gauge piece 14 is provided with a sloping face 35 formed at and conforming to the angle of slope of conical face 22 of the tip 12. The outer edge 36 of each gauge piece is provided with a shallow notch 37. An expandable spring band or ring 38 encircles the gauge pieces and resides in said notches 37, said ring normally urging the gauge pieces inwardly as permitted by the tip 12. Notches 39 in the outer cylindrical face of housing 30 accommodate ring 38 when the gauge pieces are in their innermost position in which their outer edges 36 are flush with the outer cylindrical face of the housing, as in Fig. 1.

It will be clear that the axial movement of tip 12 will result in a transverse movement of gauge pieces 14 and that said latter movement is half as great as the former. Thus, the opposite gauge pieces together have a transverse movement exactly equal to the axial movement of the tip.

In order that the gauge pieces move only laterally when wedged apart by the tip, means are provided to obviate any angular or longitudinal movement of said gauge pieces. As shown, such means comprises a laterally directed tongue 40 on each gauge piece and a slideway 41 opening into each slot 32 and guiding said tongues.

When the tip 12 is withdrawn against face 28 of member 24, spring ring 38 will retract gauge pieces 14 to the smallest measuring position of Fig. 1, and the reading on the micrometer head 10 will be zero as shown. When barrel 15 is turned, the expanded measurement across the opposite gauge pieces will be read directly on the micrometer head in the usual way. Thus, by inserting the housing end of the gauge in a hole, holding the member 24, and turning barrel 15 until the gauge pieces are stopped by the wall of the hole, the exact size of the latter is shown by the graduations on the micrometer head.

In the modification of Fig. 6, the body is affixed to member 24 in the same way as is body 30. In this case, however, the body is provided with a conical face 51 from which a set of segments 53 extends, the same being defined by longitudinal slots 54 comparable to slots 32. The stem 11, in this case, is provided with an elongated extension rod 55 on the end of which is affixed a cone 56 having a conical face 57 equal and opposite to face 51.

Conical faces 51 and 57 are on a one-to-one angle or slope rather than on the one-to-two slope of conical face 22. The gauge pieces 58 fit slots 54 and each has angularly directed faces 59 and 60 at the angle of the respective conical faces 51 and 57 and held in engagement with said faces by spring rings or bands 61 comparable to rings 38.

It will be seen that axial movement of the stem 11 relative to housing 50 will cause transverse movement of gauge pieces 55 by moving cone 56 toward or away from conical face 51. In this case, there is an endwise shift of the gauge pieces relative to the housing. Hence, the one-to-one slope of faces 51 and 57. The reading on the micrometer head is made as before.

In the modification of Figs. 7 and 8, the tip 70 on stem 11 extends beyond the end of member 24 and the housings 30 or 50 are omitted. In this case, said tip is reversed from the tip of the form in Fig. 1, but the slope thereof is the same. Instead of separate gauge pieces 14 or 55, an annular and endless helically coiled means 71 encircles tip 70, the same having outer gauging coil portions 72 that are cylindrically arranged and inner sloping tip-engaging coil portions 73 at the angle of the slope of tip 70. Said means 71 is formed of spring wire of round or square section, as desired, the coils thereof expanding and contracting according to the endwise movement of tip 70 relative to end shoulder 74 of member 24. The angle of slope of tip 70 is the same as that of tip 12 so that the diametral expansion of coil portions 72 equals the axial movement of tip 70 as in the first form of the invention.

While the invention that has been illustrated and described is now regarded as the preferred embodiments, the constructions are, of course, subject to modifications without departing from the spirit and scope of the invention. It is therefore not desired to restrict the invention to the particular forms of construction illustrated and described, but to cover all modifications that may fall within the scope of the appended claims.

Having thus described the invention, what is claimed and desired to be secured by Letters Patent is:

1. In a hole gauge having a micrometer head provided with a fixed sleeve and an axially movable stem extending concentrically from said sleeve and with an elongated body affixed to the sleeve and having a bore through which the stem extends, there being a conical tip on the end of said stem and beyond the end of said body, the apex of said tip being outwardly directed, the improvement that comprises a tubular housing around the tip connected to and forming an extension of the elongated body, an end wall on said housing formed with a conical recess to receive the apex of said tip when projected in a direction away from the end of the elongated body, the tubular wall of the tubular housing comprising a set of segments defined by longitudinal slots that extend for the entire length of the housing, the ends of the segments opposite the end wall of the housing fitting over the end of the elongated body, a set of gauge pieces each equal in length to the overall length of the housing and residing in the slots in said housing, each gauge piece having a sloping edge face at an angle conforming to the angle of the conical tip, means encircling the set of gauge pieces and resiliently urging the sloping edge faces thereof into engagement with the tip, and a lateral projection on each gauge piece, there being a lateral slideway in each segment to slidingly guide the gauge pieces during transverse movement of said pieces as controlled by the movement of the tip.

2. In a hole gauge according to claim 1: the lateral projections on the gauge pieces being spaced fordwardly from the sloping edge faces of said pieces.

JOHN H. DULLIGAN.

References Cited in the file of this patent

UNITED STATES PATENTS

| Number | Name | Date |
|---|---|---|
| 1,417,001 | Volis | May 23, 1922 |
| 1,554,226 | Martell | Sept. 22, 1925 |
| 1,760,717 | Peglow | May 27, 1930 |
| 2,047,607 | Zimmerman | July 14, 1936 |
| 2,135,912 | Rae | Nov. 8, 1938 |
| 2,358,749 | Volis et al. | Sept. 19, 1944 |

FOREIGN PATENTS

| Number | Country | Date |
|---|---|---|
| 224,234 | Switzerland | June 1, 1943 |
| 336,996 | Germany | May 21, 1921 |
| 524,392 | France | Sept. 2, 1921 |
| 582,941 | Great Britain | Dec. 3, 1946 |
| 612,457 | Great Britain | Nov. 12, 1948 |

OTHER REFERENCES

Publ.: "Industrial Inspection Methods"; page 164, Fig. 8.20 by L. C. Michelon, published by Harper & Bros.